United States Patent [19]

Feldstein

[11] Patent Number: 4,727,986

[45] Date of Patent: Mar. 1, 1988

[54] SQUEEGEE

[76] Inventor: Jeffrey E. Feldstein, 19 Dumond Pl., Coram, N.Y. 11727

[21] Appl. No.: 10,076

[22] Filed: Feb. 2, 1987

[51] Int. Cl.$^4$ ............................ B65D 3/00; B60S 3/04
[52] U.S. Cl. .................................... 206/229; 206/361; 15/121; 15/245
[58] Field of Search ................. 15/106, 111, 114, 118, 15/121, 245; 206/223, 229, 234, 812, 361

[56] References Cited

U.S. PATENT DOCUMENTS

| 2,055,389 | 9/1936 | Rosenberg | 206/229 |
| 2,459,247 | 1/1949 | Skold | 206/229 |
| 2,639,454 | 5/1953 | Dory | 206/223 |
| 2,715,745 | 8/1955 | Jacobsen | 15/121 |
| 4,409,116 | 10/1983 | Lodico | 206/812 |

Primary Examiner—Harvey C. Hornsby
Assistant Examiner—Corinne Reinckens
Attorney, Agent, or Firm—Edwin D. Schindler

[57] ABSTRACT

A squeegee is disclosed having a housing which is capable of being unfolded for use. The housing, which may, preferably, be made of any durable material is preferably rectangular in shape with a top surface and a bottom surface. Each surface preferably has a planar shape. If rectangularly-shaped, the housing is to have a plurality of side panels, three of which are affixed to the bottom surface. The fourth side panel is flexibly connected to both the bottom surface and the top surface, preferably by two hingeable connections. When in the closed, or folded position, the top surface is to rest on the plurality of panels, parallel to the bottom surface. A sponge is, preferably, removably affixed to the inner side of the top surface; a wiper blade is, preferably, removably affixed to the inner side of the flexibly connected panel. When the squeegee is unfolded, the sponge and the wiper blade may be used to clean a surface, such as an automobile windshield. The housing of the squeegee may be provided with locking means to secure it in the closed position when not in use.

12 Claims, 6 Drawing Figures

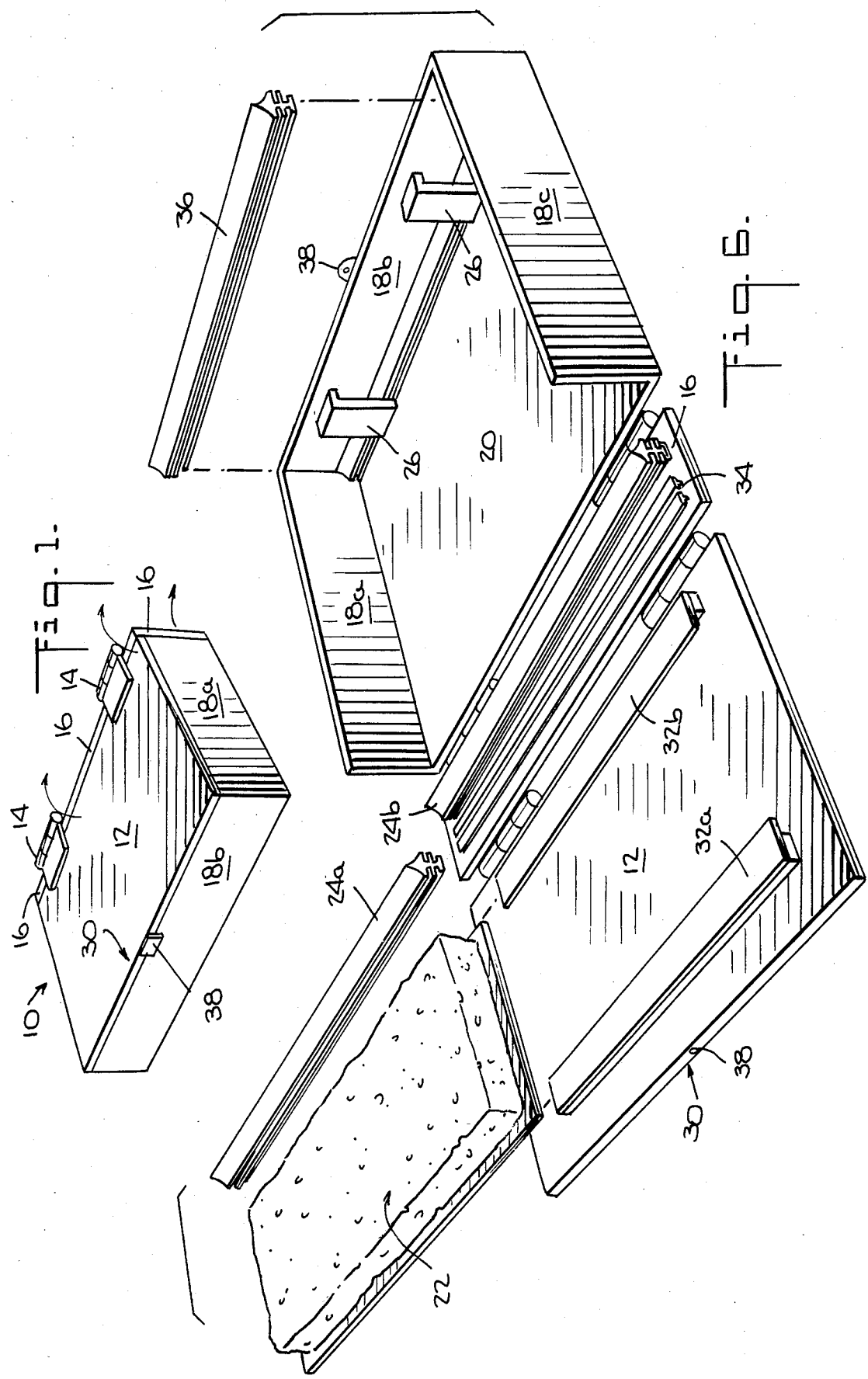

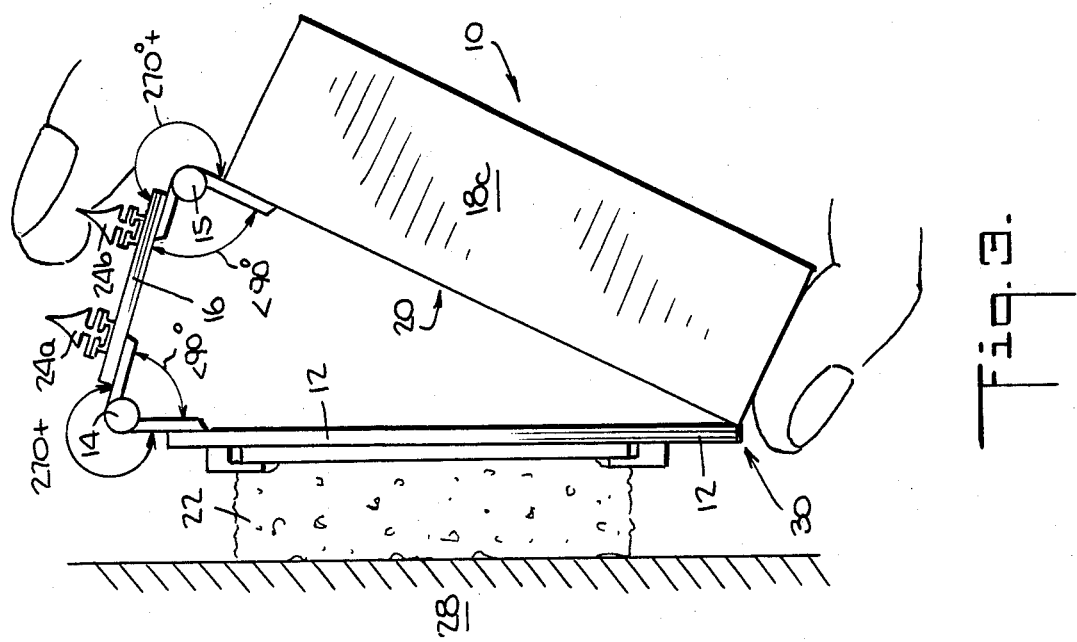
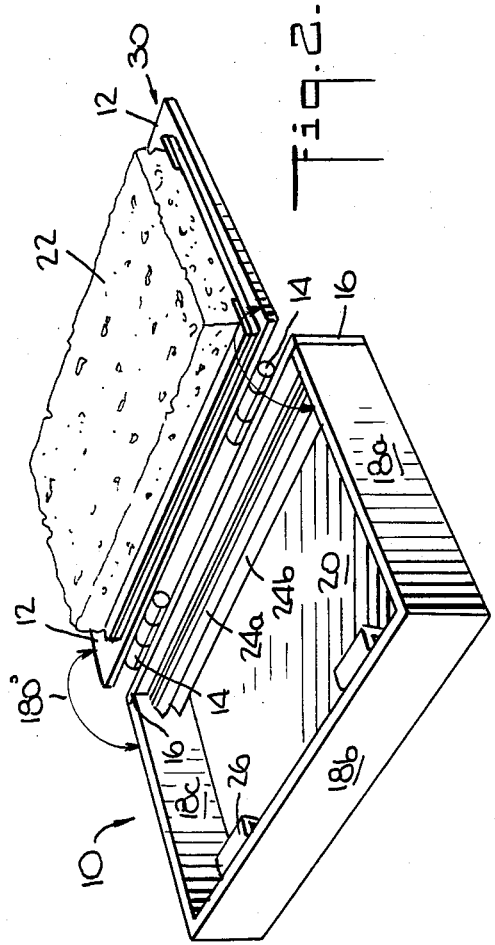
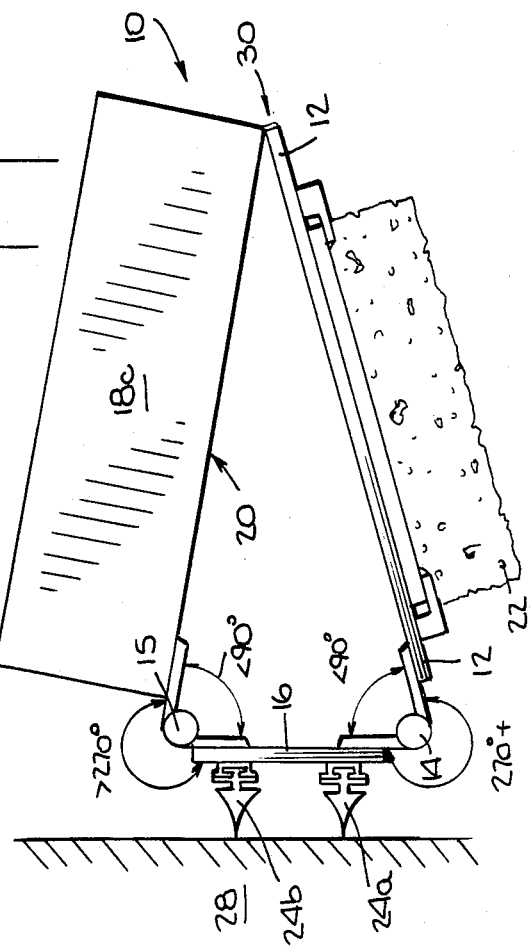

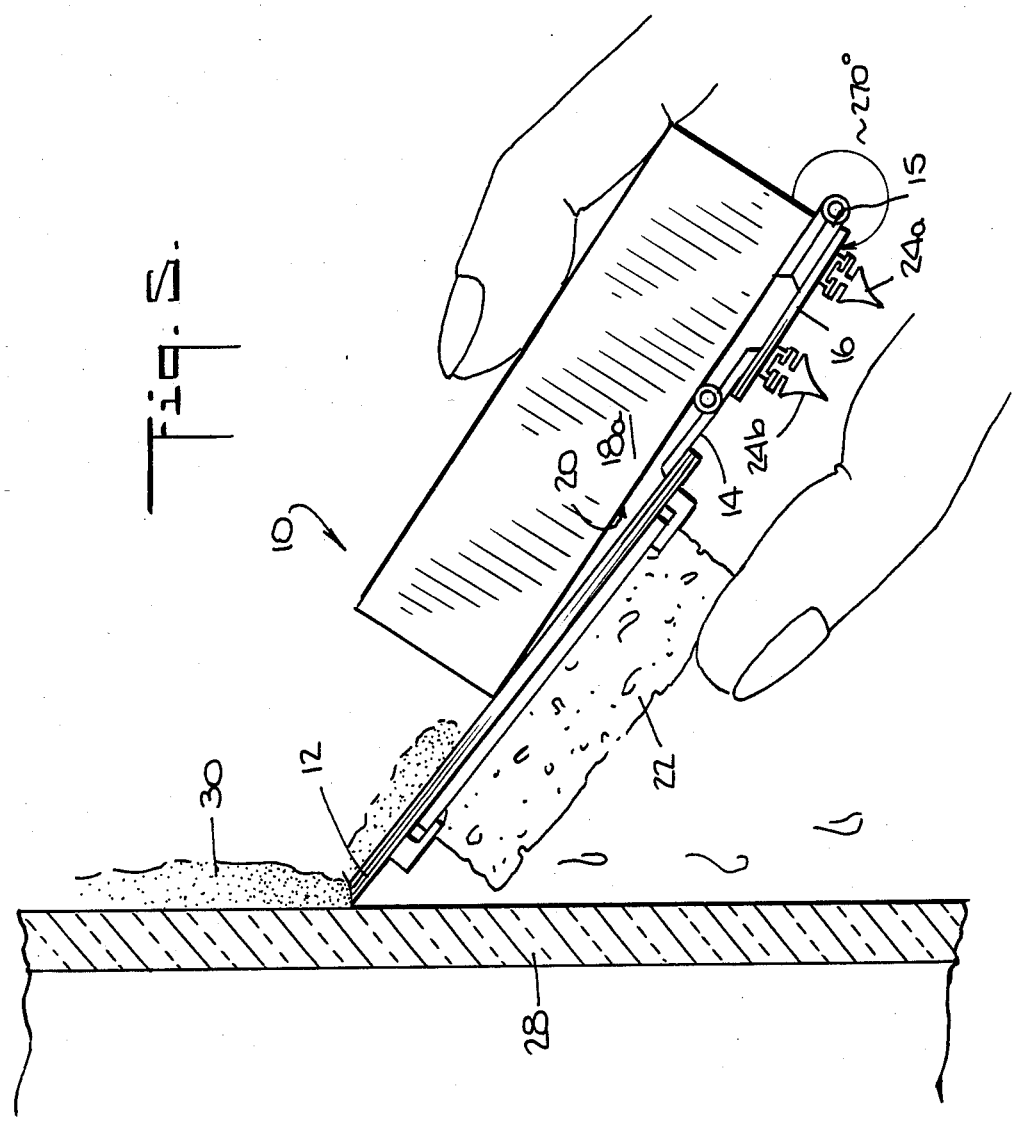

SQUEEGEE

BACKGROUND OF THE INVENTION

1. Field of the Invention

The present invention relates generally to an improved squeegee useful for cleaning windows, such as automobile windshields. More particularly, the present invention relates to a compact squeegee that may be easily used and conveniently stored, for example, in the glove compartment of an automobile. This is accomplished by providing, preferably, a rectangular housing having within the housing a sponge and a wiper blade. The present invention may also be used as an ice scrapper. In a manner which will be fully explained in detail hereinafter, the housing is unfolded for use of the squeegee and, upon completion, folded closed for convenient storage.

2. Description of the Prior Art

Squeegee articles presently known to the prior art generally consist of a head portion, having both a sponge and a wiper blade, and a handle portion. The handle portion of such artilces is typically a long cylindrical stick, or of similar configuration, which is affixed to the head portion. The use of such a handle portion generally makes storage inconvenient and storage with the glove compartment of an automobile impossible. In addition, prior art devices typically provide no protective covering for the head portion's wiper blade and sponge. The sponge usually remains water-soaked for some considerable period of time following use thereby preventing its storage in areas where papers or other water-sensitive materials may be present.

The present invention, with its convenient housing, which unfolds for use and refolds for storage, overcomes the aforesaid and other well known and common disadvantages inherent in the prior art.

SUMMARY OF THE INVENTION

It is, therefore, an object of the present invention to provide a squeegee article that is capable of easy usage and convenient storage.

It is a further object of the invention to provide a squeegee article, which may be safely stored in areas where water-sensitive articles may be present.

It is still a further object of the present invention to provide a squeegee article that is compact and light weight.

Another object of the present invention is to provide a squeegee article that is inexpensive to manufacture and durable.

An additional object of the invention is to provide a squeegee article that overcomes the shortcomings inherent in prior art devices.

The foregoing and related objects are accomplished by a squeegee having a durable housing which is capable of being unfolded for use. The use, which may be made of plastic, metal, wood, a ceramic material, or any durable material. The housing is, preferably, rectangular in shape with a first, or top, surface and a second, or bottom, surface each having, preferably, a planar shape and, if rectangular, four side panels positioned between and along the edges of the top and bottom surfaces of the housing. It should be pointed out that reference to one surface as the top surface and the other surface as the bottom surface is arbitrary and merely for purposes of convenience when discussing the present invention.

Three of the side panels are affixed to the bottom surface of the housing, but not to the top surface. The fourth side panel, assuming that the housing is rectangular in shape, is hingeably connected to the edge of the bottom surface which does not have affixed to it a side panel. Connected, in turn, to the hingeably connected side panel, at the edge opposite that which is hingeably connected to the bottom surface, is the top surface of the housing. When not in use, the housing is to be folded closed so that the hingeably connected side panel is perpendicular to two of the other affixed side panels and opposite to the remaining, affixed side panel; the top surface is to be parallel to the bottom surface and to be supported by the side panels. When closed, the present invention is, preferably, to have a cube or similar box shape. A sponge and, at least, one wiper blade are to be located on the inner side of the top surface and the inner side of the hingeably connected side panel, respectively. When using the squeegee of the present invention, the upper surface and hingeably connected side panel are to be folded back so that the edge of the top panel, the edge opposite and parallel to the edge with the hingeable connection, is substantially in line with the outer edge of the bottom surface, which is opposite and parallel to the outer edge of the bottom surface with the hingeable connection. In this fashion, one may conveniently hold the squeegee to wash a surface with the sponge portion of the invention. Upon completion of this task, one may conveniently hold the squeegee in another fashion which would permit use of the wiper blades. The squeegee may also be used as an ice scrapper.

Other objects and features of the present invention will be apparent to the skilled art worker. To the accomplishment of the above and related objects, this invention may be embodied in the form illustrated in the accompanying drawing, attention being called to the fact, however, that the drawing is illustrative only, and that changes may be made in specific construction and design illustrated and described within the scope of the appended claims.

BRIEF DESCRIPTION OF THE DRAWING

In the drawing, wherein similar reference numerals denote similar features throughout the several views:

FIG. 1 is a perspective view of the squeegee article of the present invention in the closed, or folded, position when the present invention is not in use;

FIG. 2 is a perspective view of the squeegee article of the present invention showing the top surface of the invention rotated 180 degrees along the axis created by the hingeable connection between the top surface and hingeably connected side panel;

FIG. 3 is a side view, in elevation, showing a person using the sponge portion of the squeegee article of the present invention to wash a surface;

FIG. 4 is a side view, in elevation, showing use of the wiper blade portion of the present invention;

FIG. 3 is a side view, in elevation, showing use of the squeegee of the present invention as an ice scrapper; and FIG. 6 is a perspective view of the individual features of the squeegee article of the present invention and how the sponge and wiper blades may be removably attached to the invention and, further, how additional wiper blades may be stored within the invention.

DETAILED DESCRIPTION OF THE PREFERRED EMBODIMENTS

Turning now, in detail, to a description of the drawing, FIG. 1 is a perspective view of the squeegee 10 of the present invention in its closed, or folded, position for storage in, for example, the glove compartment of an automobile. The housing of squeegee 10, shown in FIG. 1, may be made out of any rigid material, such as metal, e.g., stainless steel, wood, a ceramic material and, preferably, plastic.

The present invention as shown in FIG. 1 will be described as having a rectangular shape, though, it should be recognized that various other shapes are possible and are included with the scope of the invention.

With reference to FIG. 2, to unfold or open squeegee 10, top surface 12 is rotated along the axis created by a flexible or hingeable connection 14 between top surface 12 and side panel 16. (For purposes of discussion and illustration, the invention will be described as having hingeable connections, though, it should be understood, that any flexible or foldable connection would suffice in place of the use of hinges.) Side panel 16, unlike side panels 18a, 18b, 18c is not affixed to bottom surface 20 of squeegee 10. In FIG. 2, upper surface 12 is shown having been rotated 180 degrees along hingeable connection 14. It should again be stressed that reference to certain portions of the invention as top and bottom surfaces, or as side panels, is for purposes of convenience of discussion only and does not represent a limitation in construction or design of the present invention.

From the view presented in FIG. 2, one can note that sponge 22 is, preferably, located on the inner side of top surface 12. Additionally, along the inner side of panel 16 is located at least one wiper blade. In the preferred embodiment illustrated in the drawing, a set of two wiper blades 24a, 24b is shown. The number and arrangement of wiper blades 24 along the inner side of panel 16 is dependent upon the desires of the user. Finally, a preferred embodiment of the present invention includes a wiper blade holder 26, shown in FIG. 2 as well as FIG. 5.

Turning now to consideration of FIG. 3, shown is a side view, in elevation, of the squeegee 10 of the present invention being used to wash a surface 28 with sponge 22. From this view, it can be seen that, when in use, top surface 12, having sponge 22 on its inner side, is rotated about the axis created by connection 14, relative to the inner side of panel 16, which holds wiper blades 24, at an angle slightly greater than 270 degrees. A second hingeable connection 15 is located between the edge of panel 16, which is parallel to hingeable connection 14, and bottom surface 20. When squeegee 10 is in use, panel 16 is rotated along the axis created by hingeable connection 15, relative to bottom surface 20, at an angle of slightly greater than 270 degrees. Located at the interface between bottom surface 20 and top surface 12 should be means for holding in place bottom surface 20 relative to top surface 12 such as, for example, either a protruding ridge 30 or a depression (not shown) on either surface to catch and hold in place the edge of the opposite surface. In the drawing, all figures show a ridge 30 located at an edge of top surface 12. When the present invention is in use, it should be seen that an isosceles triangle is essentially created by top surface 12, panel 16 and bottom surface 20.

Once surface 28 has been sufficiently washed with sponge 22, squeegee 10, while maintaining the same open configuration described above and shown in FIG. 3, is re-positioned by the user to wipe surface 28 with wiper blades 24a, 24b. As discussed above, the number of wiper blades employed, and their arrangement, is dependent upon the preference of the manufacturer in accordance with the present description.

It should also be noted at this point in reference to FIGS. 3 and 4 that if one were to rotate hingeable connection 15, substantially, an additional 90 degrees (and thereby rotate back hingeable connection 14 to an equal extent), the edge of top surface 12, having ridge 30, would extend outward beyond the edge of bottom surface 20 which had interfaced with top surface 12 (see, FIGS. 3 and 4). This edge of top surface 12, shown having ridge 30 (though it need not have such a ridge, as described above), may be held in an appropriate fashion by the user to act as an ice scrapper and, optionally, may be provided with teeth or scales for such a purpose.

In FIG. 5, squeegee 10 is shown being used as an ice scrapper. In this view, top surface 12 is being used to scrape ice 32 from surface 28; hingeable connection 15 is rotated approximately 270 degrees from its original, or folded position, while hingeable connection 14 is rotated approximately 90 degrees from its folded position.

Finally, FIG. 6 is a perspective view of the squeegee 10 of the present invention illustrating how sponge 22 and wiper blades 24a, 24b may be slidably connected and removed from top surface 12 and side panel 16, respectively. It should be stressed that the slidable connections 32a, 32b and 34, respectively, are only preferred means for removably connecting sponge 22 and wiper blades 24 to squeegee 10. Other means for removable connection of sponges and wiper blades for the invention include, for example, Velcro and snaps.

FIG. 6 also shows a preferred embodiment of how additional wiper blades 36 may be stored in wiper blade holder 26. Finally, it is preferable that the squeegee of the present invention include lock 38 for securing the squeegee 10 in the folded or closed position when the squeegee is not in use (see, generally, FIGS. 1 and 6). A preferred locking means 38 is a hook-and-eye type of lock. Other suitable locking means are, of course, available and will be obvious to those skilled in the art.

While only several embodiments of the present invention are shown and described, it will be obvious to those of ordinary skill in the art that the invention may be modified in various ways without departing from the spirit and scope of the invention.

What is claimed is:

1. A squeegee, comprising:
   a housing, having an inner side and an outer side which is capable of being opened and closed, said housing having at least two surfaces, said surfaces being a first surface and a second surface, said surfaces being dimensionally-spaced from one another by a plurality of panels; a sponge removable affixed to the side of said first surface which is part of said inner side of said housing when said housing is closed;
   a first flexible connection between one panel of said plurality of panels of said housing and said second surface of said housing; at least one wiper blade removably affixed to the side of said panel which is part of said inner side of said housing when said housing is closed; and a second flexible connection between said panel having said first flexible connection and said first surface of said housing, with said plurality of panels, other than said panel having said first and second flexible connections, being affixed only to said second surface, so that said sponge and said wiper blade are capable of being removably contained within the inner side of said housing when said housing is closed and when said housing is opened, the sponge and the wiper blade are capable of cleaning a window or other surface.

2. The squeegee according to claim 1, wherein said housing is rectangular in shape with said first and second surfaces being planar and dimensionally-spaced from one another by said plurality of panels in which said plurality is four.

3. The squeegee according to claim 1, wherein the sponge and the wiper blade are removably affixed to said inner side of said housing by a slidable connection.

4. The squeegee according to claim 1, wherein said flexible connections are hinges.

5. The squeegee according to claim 1, wherein said housing is made of plastic.

6. The squeegee according to claim 1, wherein said housing is made of a ceramic material.

7. The squeegee according to claim 1, wherein said housing is made of wood.

8. The squeegee according to claim 1, wherein said inner side of said housing includes means for securing a supply of extra wiper blades.

9. The squeegee according to claim 1, further comprising means for locking said housing when said housing is closed.

10. The squeegee according to claim 9, wherein said means for locking is a hook-and-eye lock.

11. The squeegee according to claim 1, wherein said first surface is a top surface and said second surface is a bottom surface.

12. The squeegee according to claim 1, wherein said first surface had a ridge extending outwardly from one edge for holding in position said first surface to an outer edge of said second surface.

* * * * *

UNITED STATES PATENT AND TRADEMARK OFFICE
CERTIFICATE OF CORRECTION

PATENT NO. : 4,727,986

DATED : March 1, 1988

INVENTOR(S) : Jeffrey E. Feldstein

It is certified that error appears in the above-identified patent and that said Letters Patent is hereby corrected as shown below:

Col. 1, lines 14-15, delete "scrapper" and substitute --scraper--.

Col. 2, line 62, delete "3" and substitute --5--.

Col. 2, line 63, delete "scrapper" and substitute --scraper--.

Col. 4, line 17, delete "scrapper" and substitute --scraper--.

Col. 4, lines 59-60 (Claim 1), delete "removable affixed" and substitute therefor --attached--.

Col. 4, line 66, delete "removably affixed" in Claim 1, and substitute therefor --attached--.

Signed and Sealed this

Sixth Day of September, 1988

Attest:

DONALD J. QUIGG

Attesting Officer

Commissioner of Patents and Trademarks